(12) United States Patent
Cideciyan et al.

(10) Patent No.: US 8,196,019 B2
(45) Date of Patent: Jun. 5, 2012

(54) ERROR CORRECTION IN CODEWORD PAIR HEADERS IN A DATA STORAGE TAPE FORMAT

(75) Inventors: Roy D. Cideciyan, Zurich (CH); Thomas Mittelholzer, Zurich (CH); Paul J. Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1528 days.

(21) Appl. No.: 11/668,561

(22) Filed: Jan. 30, 2007

(65) Prior Publication Data

US 2008/0184089 A1 Jul. 31, 2008

(51) Int. Cl.
*G06F 11/00* (2006.01)
(52) U.S. Cl. .......................... 714/771; 714/762; 714/784
(58) Field of Classification Search ............... 714/771
See application file for complete search history.

(56) References Cited

U.S. PATENT DOCUMENTS

| | | | |
|---|---|---|---|
| 6,157,642 A | 12/2000 | Sturza et al. | |
| 6,408,416 B1 | 6/2002 | Morley et al. | |
| 6,539,514 B1 | 3/2003 | Bartlett | |
| 6,877,127 B2 | 4/2005 | Sved et al. | |
| 6,978,414 B2 * | 12/2005 | Maple et al. | 714/771 |
| 7,376,888 B2 * | 5/2008 | Jaquette et al. | 714/771 |
| 7,421,640 B2 * | 9/2008 | Cideciyan et al. | 714/771 |
| 7,432,834 B1 * | 10/2008 | Cideciyan et al. | 341/59 |
| 7,813,070 B2 * | 10/2010 | Cideciyan et al. | 360/53 |
| 7,876,516 B2 * | 1/2011 | Cideciyan et al. | 360/40 |
| 2003/0030932 A1 | 2/2003 | Sved | |
| 2004/0264023 A1 * | 12/2004 | Kimura et al. | 360/31 |
| 2005/0270856 A1 * | 12/2005 | Earhart et al. | 365/189.05 |
| 2006/0085718 A1 | 4/2006 | Jaquette et al. | |
| 2011/0252290 A1 * | 10/2011 | Cideciyan et al. | 714/771 |

FOREIGN PATENT DOCUMENTS

| | | |
|---|---|---|
| JP | 7084839 A | 3/1995 |
| JP | 2000-067529 A | 3/2000 |

(Continued)

OTHER PUBLICATIONS

Biskeborn, et al.; "Hard-Disk-Drive Technology Flat Heads for Linear Tape Recording"; IBM Journal of Research and Development; vol. 47, No. 4, p. 385; 2003.

Childers, et al.; "Six Orders of Magnitude in Linear Tape Technology: The One-Terabyte Project": IBM Journal of Research and Development; vol. 47, No. 4, p. 471; 2003.

(Continued)

*Primary Examiner* — Christopher McCarthy
(74) *Attorney, Agent, or Firm* — Law Office of Dan Shifrin, PC

(57) ABSTRACT

Error correction coding is provided for codeword headers in a data tape format, such as a Linear Tape-Open, Generation 4 (LTO-4) data tape format. The data tape format defines a codeword quad as having first and second codeword headers interleaved with first and second codeword pairs, each codeword header comprising N bytes $c_k = c_0, c_1, \ldots, c_{N-2}, c_{N-1}$ wherein K bytes $c_0 - c_{K-1}$ of the first and second headers in a codeword quad differ such that if one is known the other can be inferred. Each header byte $c_k$ of a codeword quad is redefined as comprising two interleaved (m/2)-bit nibbles, $e_k, o_k$. For each header, nibbles $e_K - e_{N-1}$ and nibbles $o_K - o_{N-1}$ are generated as a function of nibbles, $e_0 - e_{K-1}$ and $o_0 - o_{K-1}$, respectively. A codeword is assembled with the redefined headers the codeword quad is then recorded onto a recording medium.

30 Claims, 7 Drawing Sheets

FOREIGN PATENT DOCUMENTS

| | | |
|---|---|---|
| JP | 2001-043636 A | 2/2001 |
| JP | 2001-196942 A | 7/2001 |
| JP | 2004-014087 A | 1/2004 |
| JP | 2005-167709 A | 6/2005 |
| JP | 2006-085869 A | 3/2006 |
| JP | 2006-318571 A | 11/2006 |
| WO | 2006-132331 A1 | 12/2006 |

OTHER PUBLICATIONS

Jaquette; "LTO: A Better Format for Mid-Range Tape"; IBM Journal of Research and Development; vol. 47, No. 4, p. 429; 2003.

ECMA Standard 319, Jun. 2001, Swiss, pp. 71-78.

* cited by examiner

ERROR CORRECTION IN CODEWORD PAIR HEADERS IN A DATA STORAGE TAPE FORMAT

TECHNICAL FIELD

The present invention relates generally to data tape systems, such as Linear Tape-Open (LTO) systems, and, in particular to adding error correction capability to codeword pair headers in a data tape recording format.

BACKGROUND ART

In the fourth generation of the Linear Tape-Open data tape format (LTO-4), a codeword quad includes two 480-byte codeword pairs interleaved with two 10-byte codeword pair headers. Each codeword pair header (also referred to herein as "header") is comprised of a 4-byte Codeword Identifier field (bytes $c_0$-$c_3$) a 4-byte Write Pass Identifier field (bytes $c_4$-$c_7$ to identify the write pass on which a data set is written) and a 2-byte Header Parity field (bytes $c_8$-$c_9$) in the nature of a cyclic redundancy check (CRC). The two codeword pair headers have substantially the same contents (payload), differing only in the value of a Codeword Pair Designation sub-field of the Codeword Identifier field.

As defined in the LTO-4 specification, the header CRC is a Reed-Solomon (RS) code over Galois Field GF(256). In general, a finite field with $p^k$ elements, where $p>1$ is a prime number and $k>0$ is an integer, will be referred to as GF($p^k$). As illustrated in the block diagram of FIG. 1, the CRC bytes are generated by processing the header bytes sequentially through an encoder 100 based on a generator polynomial $G(y)=y^2+\alpha^{152}y+1$. After processing the bytes through the encoder, the registers 102, 104 contain the CRC bytes.

If the header parity bytes are only used to detect errors in the header, they are not capable of correcting any errors which are detected. However, when the data content of a tape drive is analyzed, many codeword pair headers with bad CRC checks are seen, which may result in the codeword pair being discarded. Given the importance of data integrity, errors in the codeword pair headers cannot be tolerated. What is needed is an increased robustness against errors, in the codeword pair header.

If the two-byte redundancy in the codeword pair header is used for correcting one byte within the codeword pair header as opposed to using it as CRC to detect errors an additional mechanism is needed to detect errors in case a miscorrection occurs. Furthermore, such a solution would be inefficient because, although it can correct all 1-bit errors within a codeword pair header, it cannot correct all 2-bit error bursts within a codeword pair header. Another possible solution would be to increase the redundancy to more than 2 bytes in order to both correct errors and to detect errors after correction. However, such a solution would necessarily decrease the format efficiency. Both 'solutions' therefore have significant drawbacks and are not desirable.

Still another solution would be to use the common part of the payload of two headers to place additional redundancy for error control and thus to increase the error correction capability. However, such a solution has a significant drawback even when compared to the current system. For example, currently if the header of one codeword pair cannot be decoded because of media defects on the tape or for other reasons but the header of the other codeword pair in the codeword quad can be decoded, then there is sufficient information to decode both headers. Such a desirable property would be lost for tape systems if additional error-control redundancy was placed into the payload instead of rewriting all the common part of the payload.

Consequently, a need exists for the capability to both detect and correct errors in codeword pair headers without introducing new drawbacks or increasing the amount of redundancy.

SUMMARY OF THE INVENTION

The present invention provides error correction coding for codeword headers in a data tape format, such as, but not limited to, the Linear Tape-Open, Generation 4 (LTO-4) data tape format. The data tape format with which the present invention may be implemented defines a codeword quad as having first and second codeword headers interleaved with first and second codeword pairs, each codeword header comprising N m-bit bytes $c_k=c_0, c_1, \ldots c_{N-2}, c_{N-1}$, where m is an even integer and wherein K m-bit bytes $c_0$-$c_{K-1}$ of the first and second headers in a codeword quad differ such that if one is known the other can be inferred. In accordance with the present invention, each header m-bit byte $c_k$ of a codeword quad is redefined as comprising two interleaved (m/2)-bit nibbles, $e_K$, $o_K$. For each header, nibbles $e_K$-$e_{N-1}$ and nibbles $o_K$-$o_{N-1}$ are generated as a function of nibbles $e_0$-$e_{K-1}$ and $o_0$-$o_{K-1}$, respectively. A codeword quad is assembled with the redefined headers and the codeword quad is then recorded onto the tape medium. In one embodiment, in which the data tape format is the LTO-4 format in which N=10 K=8 and m=8. The present invention further provides systems for providing error correction coding for such codeword headers. The present invention further provides computer program product code with instructions for providing error correction coding for such codeword headers.

DETAILED DESCRIPTION OF THE PREFERRED EMBODIMENT

In the current implementation of Linear Tape-Open, Generation 4 (LTO-4), each of the two 10-byte codeword pair header (CPH) in a codeword quad may be represented as $c_0$ $c_1 \ldots C_7 C_8 C_8$, where $c_0$ is the first byte, $c_1$ is the second byte, etc. The error control method of the present invention for the codeword pair header is based on even-odd interleaving of Reed-Solomon (RS) codewords over GF(16) and exploits the common payload in both codeword pair headers to increase robustness to address miscorrection. Considered at a high level, an LTO-4 10-byte codeword pair header is redefined as $e_0 o_0 e_1 o_1 \ldots e_7 o_7 e_8 e_9 o_9$, where $e_0$ are the left 4 bits of $c_0$ and $o_0$ are the right 4 bits of $c_0$. The same notation applies to the other bytes. The even codeword pair header $e_0 e_1 \ldots e_7 e_8 e_9$ is a Reed-Solomon codeword over GF(16). That is, the two 4-bit even parity symbols (nibbles) $e_8 e_9$ are generated in a specific manner as a function of the first eight nibbles of the event header, $e_0 e_1 \ldots e_7$. Similarly, the odd codeword pair header $o_0 o_1 \ldots o_7 o_8 o_9$ is also a Reed-Solomon codeword over GF(16). That is, the two 4-bit odd parity symbols (nibbles) $o_8 o_9$ are generated in a specific manner as a function of the first eight nibbles of the odd header, $o_0 o_1 \ldots o_7$. Thus, the same amount of redundancy that is used in the standard LTO-4 format, two bytes per codeword pair header, may also be used in the present invention although the present invention is applicable to other amounts of redundancy as well. This method is capable of correcting any 5-bit error burst in the codeword pair header without increasing the redundancy or decreasing the format efficiency of a codeword quad. Although the present invention is described here in the context of LTO-4 and its 10-byte codeword pair headers, including two bytes of redundancy, such description is not intended to be limiting. More generally, the present invention may be implemented with codeword pair headers having N m-bit bytes, K m-bit payload (bytes $c_o$-$c_{K-1}$) and N-K redundancy bytes (bytes $c_K$-$C_{N-1}$). Additionally, for a standard RS code, $N<2^{(m/2)}$. Thus, for m=8, N<16. Furthermore, for an extended RS code $N=2^{(m/2)}$ or $N=2^{(m/2)}+1$. Thus, for m=8, N=16 or N=17.

Figure 1:
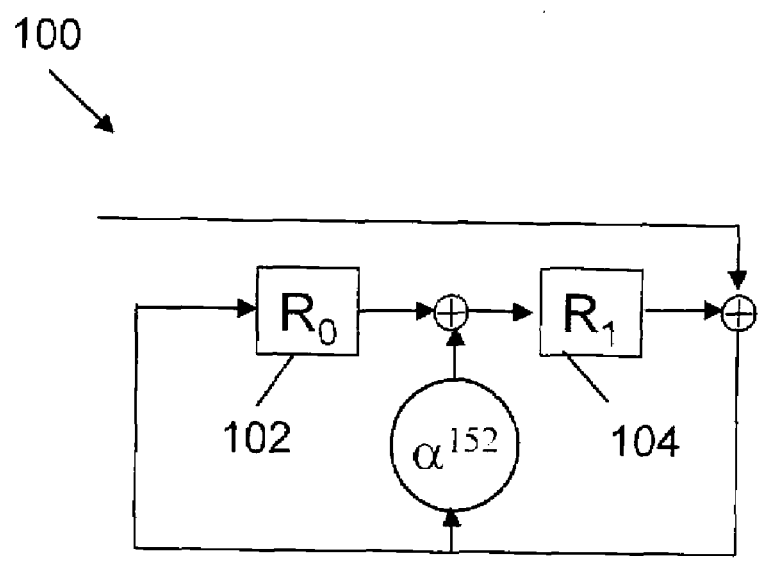
FIG. 1 is a functional diagram of an LTO-4 encoder for generating header CRC bytes according to GF(256)
Figure 2:
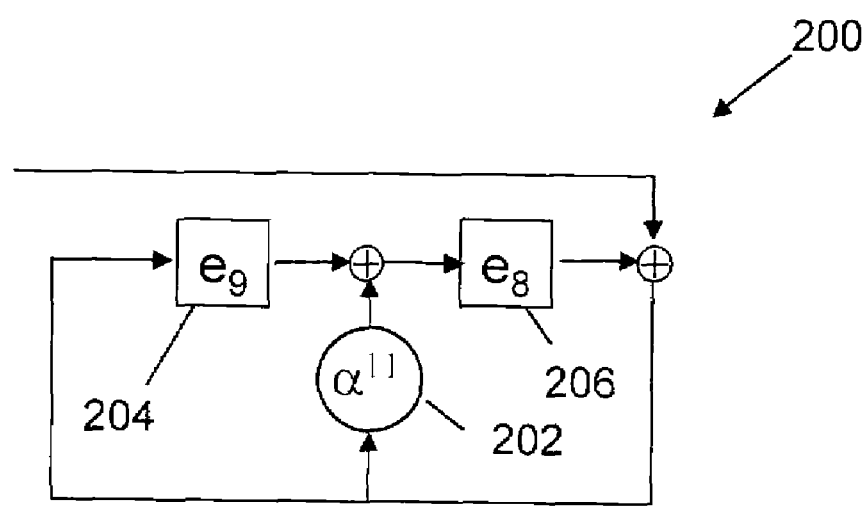
FIG. 2 is a functional diagram of an encoder of the present invention for generating header parity nibbles according to GF(16)

The hardware complexity for implementing the encoder is small. Continuing with the LTO-4 format as an example, in which N=10, K=8 and m=8, as illustrated in FIG. 2, an encoder or feedback shift register 200 of the present invention for generating header parity nibbles according to GF(16) may be implemented with a multiplier 202 and two delay elements 204, 206. In operation, both delay elements of the encoder 200 are initialized with zeros and the even data nibbles $e_0, e_1, \ldots, e_7$ are processed through the encoder 200 over GF(16). The field GF(16) is determined by the primitive polynomial $p(z)=z^4+z+1$. In polynomial notation:

$$e(y)=e_0 y^9 + e_1 y^8 + e_2 y^7 + \ldots + e_7 y^2 + e_8 y + e_9$$

$$d^{(even)}(y)+e_0 y^9 + e_1 y^8 + e_2 y^7 + \ldots + e_7 y^2$$

$$e_8 y + e_9 = R_{G(y)}[d^{(even)}(y)]$$

where $R_{G(y)}[d^{(even)}(y)]$ denotes the remainder polynomial of the division of $d^{(even)}(y)$ by the generator polynomial $G(y) = (y+\alpha^7)(y+\alpha^8) = y^2 + \alpha^{11} y + 1$ and $\alpha$ is a primitive element of GF(16) satisfying $\alpha^4 + \alpha 1 = 0$. After the first eight even nibbles of the header have been processed, the even parity nibbles $e_8$ an $e_9$ are obtained from the contents of the two delay elements 204, 206. In the same fashion, the odd parity nibbles $o_8$ an $o_9$ are obtained from a parallel encoder (not shown).

Figure 3:
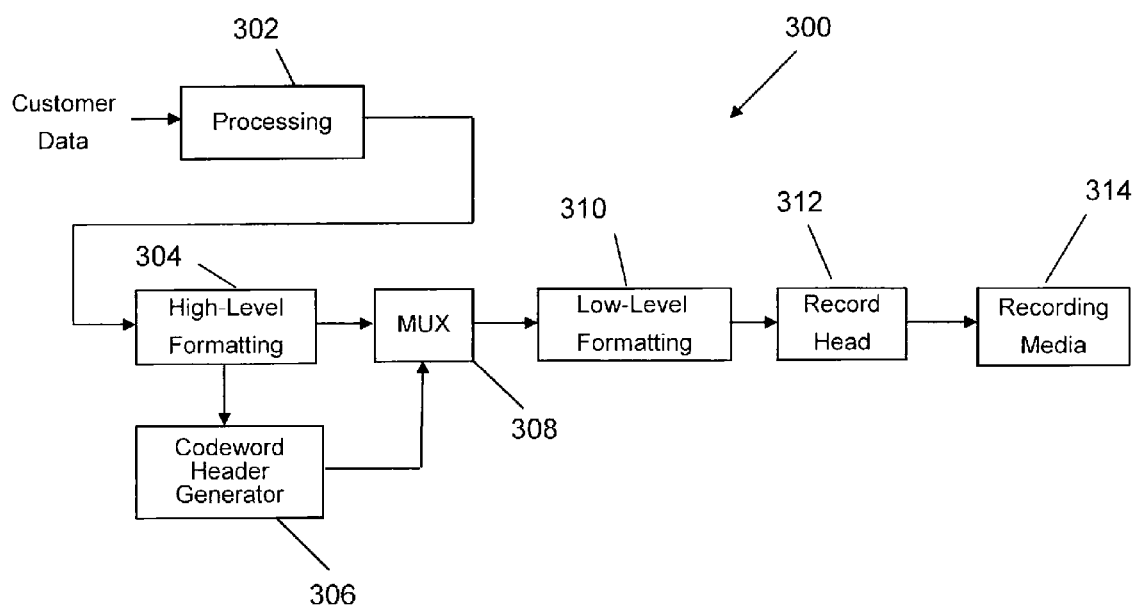
FIG. 3 is a block diagram of a write channel in which an encoder of the present invention may be implemented.

FIG. 3 is a block diagram of a write channel 300 in which an encoder of the present invention may be implemented. Customer data is received in a processor 302 which may perform such functions as compressing and encrypting the data. A high level formatter 304 may add ECC to the processed data and organize the data in a structure which is suitable for recording. A generator 306 generates encoded codeword pair headers. The CPHs are interleaved with the high-level formatted data through a MUX 308 and transmitted to a low level formatter 310 which may add timing and synchronization information to the data stream. The resulting data is then sent to a record head 312 for recording onto the media 314.

An encoder of the present invention for generating header parity nibbles according to $GF(2^{(m/2)})$ may be implemented with a feedback shift register and N-K delay elements whose connections are given by the coefficients of the generator polynomial $G(y)=(y+\alpha^l)(y+\alpha^{l+1}) \ldots (y+\alpha^{l+N-K-1})$, where $\alpha$ is a primitive element of $GF(2^{(m/2)})$ and l is a predetermined integer. In operation, all delay elements of the feedback shift register are initialized with zeros and the even data nibbles $e_0, e_1, \ldots, e_{K-1}$ are processed through the feedback shift register over $GF(2^{(m/2)})$. The field $GF(2^{(m/2)})$ is determined by a primitive polynomial p(z) of degree m/2. In polynomial notation:

$$e(y)=e_0 y^N + e_1 y^{N-1} e_2 y^{N-2} + \ldots + e_{N-3} y^2 + e_{N-2} y + e_{N-1}$$

$$d^{(even)}(y)=e_0 y^{N-1} + e_1 y^{N-2} e_2 y^{N-3} + \ldots + e_{K-1} y^{N-K}$$

$$e_K y^{N-K-1} + \ldots + E_{N-1} = R_{G(y)}[d^{(even)}(y)]$$

where $R_{G(y)}[d^{(even)}(y)]$ denotes the remainder polynomial of the division of $d^{(even)}(y)$ by the generator polynomial G(y). After the first K even nibbles of the header have been processed, the N-K even parity nibbles $e_K \ldots e_{N-1}$ are obtained from the contents of the delay elements of the feedback shift register. In the same fashion, the odd parity nibbles $o_K \ldots o_{N-1}$ are obtained from a parallel encoder.

Figure 4:
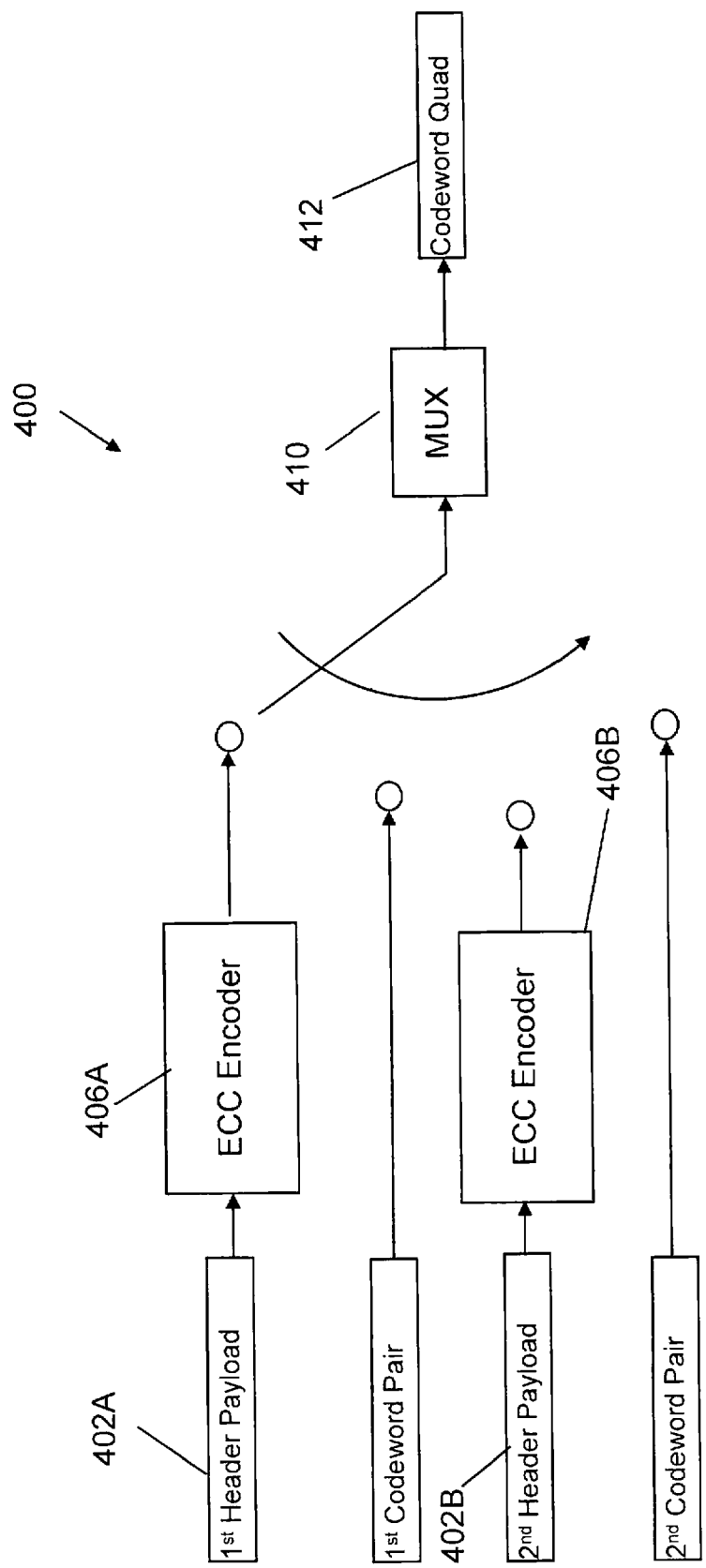
FIG. 4 is a block diagram of one configuration of an encoder of the present invention for generating header parity nibbles according to GF(16)

FIG. 4 is a block diagram of one configuration of an encoder 400 of the present invention for generating header parity nibbles according to GF(16). Header payloads 402A, 402B for the two CPHs are encoded by parallel ECC encoders 406A, 406B. A MUX 410 sequentially receives and interleaves the encoded CPHs with the codeword pair payloads (customer data) to form a codeword quad 412.

Figure 5:
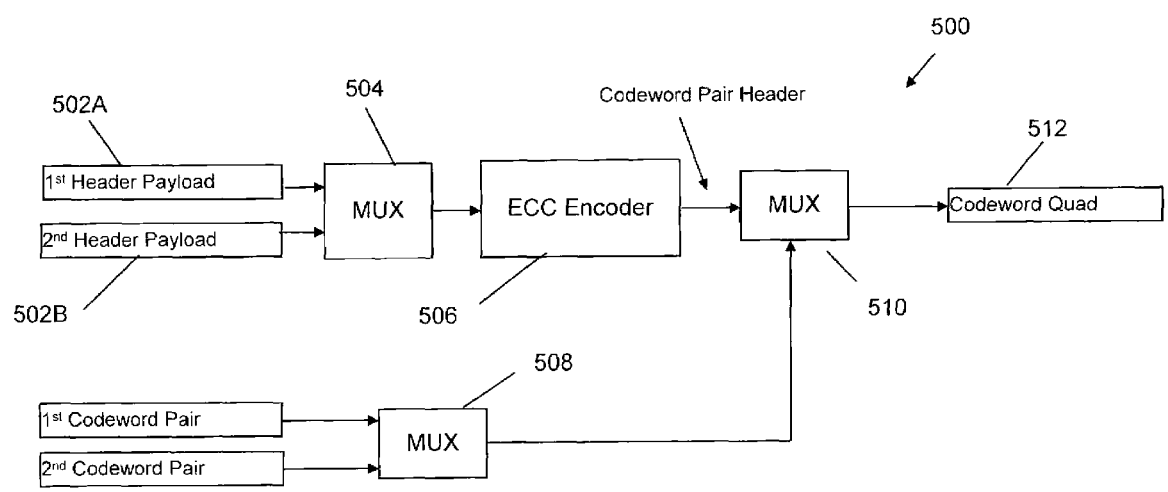
FIG. 5 is a block diagram of another configuration of an encoder of the present invention for generating header parity nibbles according to GF(16)

FIG. 5 is a block diagram of an alternative embodiment of an encoder 500 of the present invention in which only a single encoder is used. The first and second header payloads 502A, 502B for the two CPHs are received by a first MUX 504 for alternate encoding by the ECC encoder 506. The first and second codewords are received by a second MUX 508. A third MUX 510 sequentially receives and interleaves the encoded CPHs with the codeword pair payloads to form the codeword quad 512.

Figure 6:
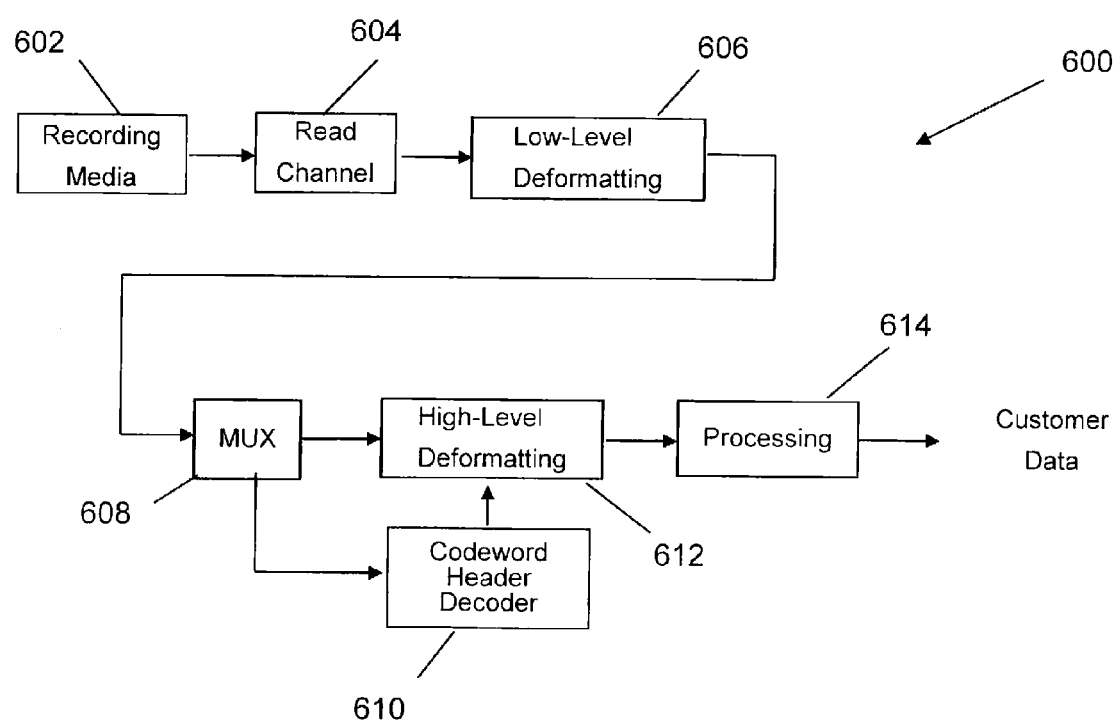
FIG. 6 is a block diagram of a read channel in which a decoder of the present invention may be implemented.

FIG. 6 is a block diagram of the components 600 used to read and recreate the recorded customer data according to the present invention. Data on the recording media 602 is read through a read channel 604 to reproduce the recorded bits from the media. A low level deformatter 606 detects and removes the timing and synchronization information from the data stream. The data is then sent to a MUX 608. From a codeword quad, the MU 608 alternately transmits the CPHs to a codeword header decoder 610 where codeword header information is removed and decoded as described below in accordance with the present invention. The decoded headers and the codeword pairs from the MUX 608 undergo high level deformatting in a deformatter 612 to perform ECC and reorganization in preparation for further processing. A processor 614 may decrypt and decompress the data after which the original customer data is output.

The hardware complexity for implementing the decoder for one interleave of a CPH is also small as the decoder may be implemented with little more than three multipliers, two adders and one divider over the Galois field GF(16). In a first step, the even and odd CPHs $c^{(even)}$ and $c^{(odd)}$ are decoded separately using the same decoding algorithm. The decoding algorithm is described for the case of the even CPH. As will be appreciated, the decoder for $c^{(odd)}$ is obtained by replacing the superscripts $^{(even)}$ with $^{(odd)}$.

If a received even CPH is corrupted by some error vector $e^{(even)}(y)$:

$$r^{(even)}(y) = c^{(even)}(y) e^{(even)}(y)$$

Passing the received even CPH through the encoder 200 for $c^{(even)}$, the N–K check symbols (m/2-bit nibbles) are computed as:

$$b^{(even)}(y) = b_{N-k-1}^{(EVEN)} Y^{N-K-1} + \ldots + b_0^{(even)} = R_{G(y)}[r^{(even)}(y)].$$

If no error occurs, the check symbols $b_{N-K-1}^{(even)} \ldots b_0^{(even)}$ will be zero. If, on the other hand, at least one but no more than (N–K)/2 nibbles are in error, at least one of the check symbols $b_{N-K-1}^{(even)} \ldots b_0^{(even)}$ will be non-zero. The syndrome $s^{(even)} = [s_0^{(even)}, s_1^{(even)}, \ldots, s_{N-K-2}^{(even)}, s_{N-K-1}^{(even)}]$ is computed:

$$s_0^{(even)} = r^{(even)}(\alpha^l) b^{(even)}(\alpha^l) = e^{(even)}(\alpha^l)$$

$$s_1^{(even)} = r^{(even)}(\alpha^{l+1}) = b^{(even)}(\alpha^{l+1}) = e^{(even)}(\alpha^{l+1})$$

$$s_{N-K-1}^{(even)} = r^{(even)}(\alpha^{l+N-K-1}) = b^{(even)}(\alpha^{l+N-K-1}) = e^{(even)}(\alpha^{l+N-K-1})$$

where the syndromes can either be computed directly from the received even CPH $r^{(even)}(y)$ or from $b^{(even)}(y)$ which may be computed form $r^{(even)}(y)$. In other words, the computation of $b^{(even)}(y)$ may simplify computations but is not necessary.

Where m=8, K=8 and N=10, l=7. The syndrome $s^{(even)} = [s_0^{(even)}, s_1^{(even)}]$ is then computed:

$$s_0^{(even)} = r^{(even)}(\alpha^7) = b_1^{(even)} \alpha^7 + b_0^{(even)} = e^{(even)}(\alpha^7) \text{ and}$$

$$s_1^{(even)} = r^{(even)}(\alpha^8) = b_1^{(even)} \alpha^8 + b_0^{(even)} = e^{(even)}(\alpha^8)$$

If a single nibble is in error, i.e., $e^{(even)}(y) = \epsilon y^j$, the syndromes become:

$$s_0^{(even)} = \epsilon \alpha^{7j} \text{ and}$$

$$s_1^{(even)} = \epsilon \alpha^{8j}.$$

Solving the two syndrome equations for $\alpha^j$ and $\epsilon$:

$$\alpha^j = s_1/s_o \quad \text{Equation (1A)}$$

$$\epsilon = s_o(\alpha^8)^j \quad \text{Equation (1B)}$$

To reduce the complexity of the decoder, $(\alpha^8)^j$ may be pre-computed for j=0, 1, . . . 9. Therefore, only one division and one multiplication over GF(16) will be sufficient to determine an error location j and error value $\epsilon$. A decoding failure is declared if $(s_0^{(even)}, s_1^{(even)}) \neq (0,0)$ and either Equation (1A) or (1B) cannot be solved; that is, if $s_0^{(even)} = 0$ or $s_1^{(even)} = 0$ or the error location j is out of bounds (i.e., j>9).

In particular, the decoder computes the syndrome:

$$s = [s^{(even)}, s^{(odd)}]$$

In the event that an RS codeword contains $n_{error}$ erroneous symbols and $n_{eras}$ erasures (errors whose locations are known but not their values) where $2 n_{error} + n_{eras} \leq N-K$, there are various well-known algebraic decoding algorithms that may be used to obtain the correct error locations and the correct error values and thus recover the original RS codeword. Additionally, decoding algorithms are known that are capable of handling error patterns with up to N–K erroneous symbols. The CPH decoder provides a decoded CPH if both decoders for the even/odd CPHs provide even/odd decoded CPHs. Otherwise the decoder declares a decoding failure.

Figure 7:
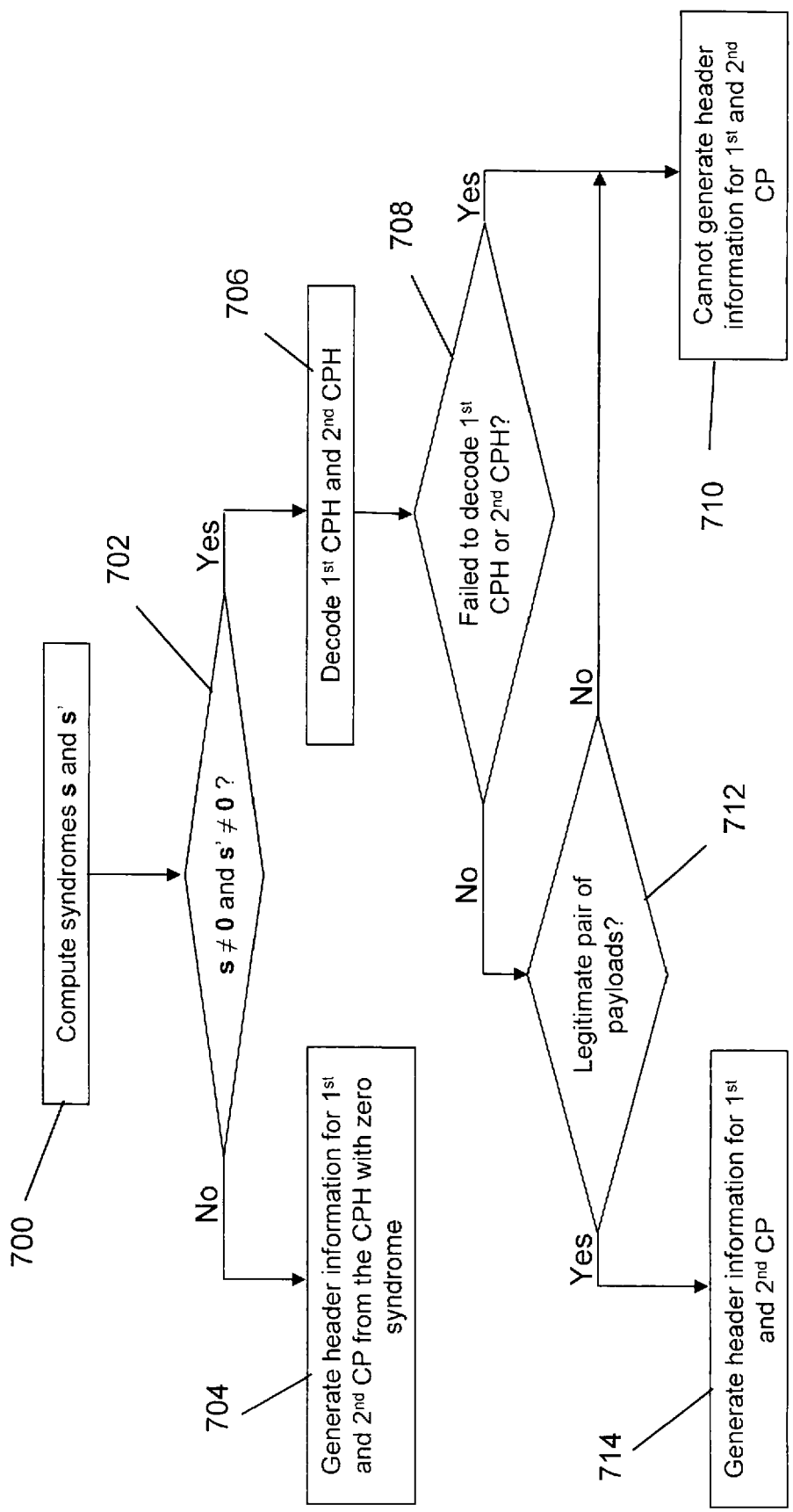
FIG. 7 is a flow chart of one method by which codeword pair headers may be decoded according to the present invention.

As previously noted, a codeword quad includes two codeword pairs (CP) and two corresponding CPHs. The syndrome of the first CPH will be denoted by s and the syndrome of the second CPH will be denoted by s'. The LTO standard defines the format and contents of a legitimate pair of first and second CPHs in a codeword quad. As previously noted, the payloads of the first and second CPH in a codeword quad is substantially the same and they differ in such a way that the second CPH can be deduced from the first CPH and vice versa. The characteristic may be used to increase the robustness of the decoding algorithm for the first and second CPH as described in the flow chart of FIG. 7.

The decoder computes the first and second CPH syndromes s and s' (step 700). If either or both of s and s' is zero (step 702), at least one of the codeword pair headers is valid. If both are zero, the header information for both the first and second codeword pairs may be generated and the legitimacy of both header payloads may be checked if desired. If only one is zero, the header information for both codeword pairs may be generated from the CPH whose syndrome (s or s') equals zero based upon the above-noted common payload characteristic (step 704).

If, on the other hand, both s and s' are non-zero, an attempt is made to decode the first and second CPHs (step 706). If either CPH fails to be successfully decoded (step 708), an assumption may be made that both CPHs are incorrect and the header information for neither can be reliably generated (step 710). Alternatively if only one CPH fails to be successfully decoded, an assumption may be made that the other CPH is correct and the header information for both codeword pairs may be generated from the CPH which is assumed to be correct, again based upon the common payload characteristic (step 704). However, because the test for the legitimate payload cannot be performed, this alternative provides no independent verification that the second header was correctly decoded and it may be generally preferable to reject both CPHs.

If both CPHs are successfully decoded (step 708), the payload of both CPHs is verified, based on the standard LTO format (step 712). If both payloads are legitimate, the header information for both codeword pairs is generated (step 714). If, instead, the pair of payloads is not legitimate, it may be assumed that a mis-correction has occurred and the header information for neither codeword pair can be reliably generated (step 710).

Figure 8:
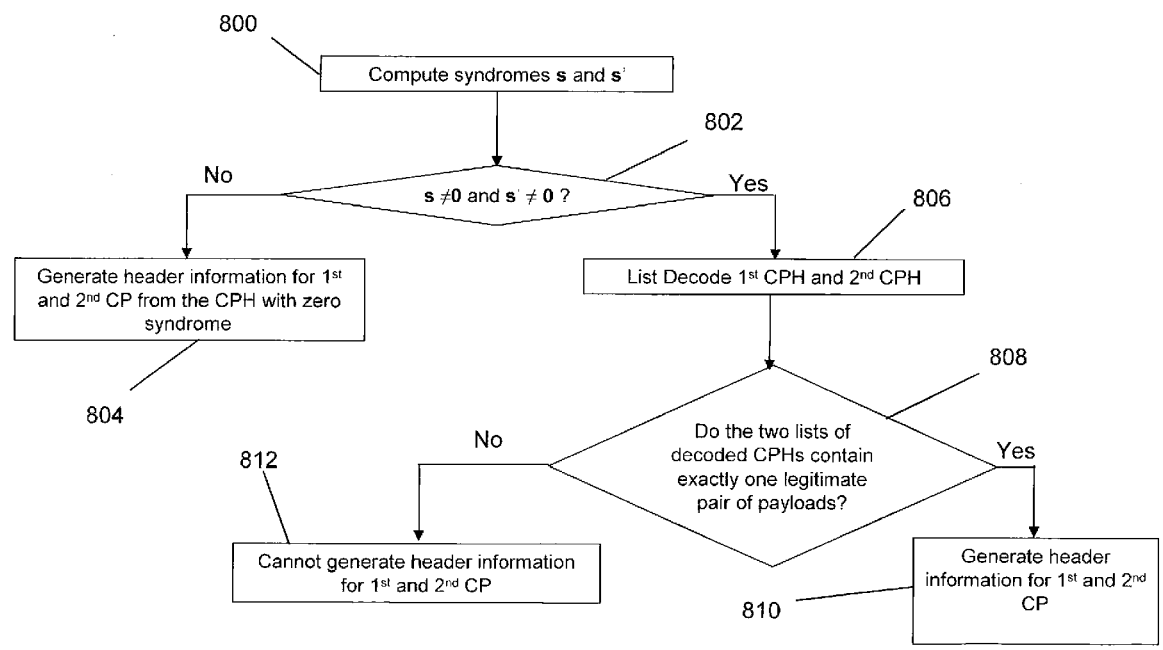
FIG. 8 is a flow chart of another method by which codeword pair headers may be decoded according to the present invention.

The flow chart of FIG. 8 illustrates an alternate use of the common-payload characteristic to increase the robustness of the decoding algorithm. As in the method of FIG. 7, the decoder computes the first and second CPH syndromes s and s' (step 800). If either or both of s and s' is zero (step 802), at least one of the codeword pair headers is valid. If both are zero, the header information for both the first and second codeword pairs may be generated and the legitimacy of both header payloads may be checked if desired. If only one is zero, the header information for both codeword pairs may be generated from the CPH whose syndrome (s or s') equals zero based upon the above-noted common payload characteristic (step 804).

If, on the other hand, both s and s' are non-zero, for each even or odd interleave of a header either a single result is generated that is believed to be correct or a list of possible results is generated (step 806). Because there are 45=10!/(2!*8!) different ways for two nibbles to be in error in a 10-nibble codeword, the list may contain 45 possible results of even or odd decoded codewords (even or odd payloads). Therefore, for each header either a single result is generated or a list with 45 or $45^2$=2025 results is generated. Thus, the list decoder will consider 1 or 45 or $45^2$ or $45^3$ or $45^4$ pairs of decoded CPHs to determine whether there is a legitimate pair of payloads. It will be appreciated that a different size list may be associated with a different size CPH. A determination is made of whether the CP payloads are legitimate (step 808). If a single result had been generated at the previous step, the payloads should favorably compare. However, if decoding one of the headers resulted in the list of possible results, a comparison is made of the list entries against the result(s) of decoding the other header. When exactly one match is identified (step 810), the probability is high that the legitimate payload has been generated. If a match cannot be identified (step 812) or there is more than one match, a failure is declared.

The present invention provides numerous benefits over the current LTO-4 formatting. A 5-bit error burst within the codeword pair header may be corrected without increasing the amount of redundancy in the codeword pair header or decreasing the format efficiency itself. Moreover, the ECC may be quickly and efficiently computed, a benefit if data needs to be re-written resulting in the data content of the header changing. By contrast, if the header was protected as part of the larger ECC structure, the entire ECC of the codeword would have to be recalculated, a time consuming process, particularly in a tape application.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chose and described in order to best explain the principles of the invention, the practical application, and to enable others of ordinary skill in the art to understand the invention for various embodiments with various modifications as are suited to the particular use contemplated. Moreover, although describe above with respect to methods and systems, the need in the art may also be met with a computer program product containing instructions for providing error correction coding to codeword headers in a data tape format or a method for deploying computing infrastructure comprising integrating computer readable code into a computer system for providing error correction coding to codeword headers in a data tape format.

What is claimed is:

1. A method for providing error correction coding to codeword headers in a data tape format, the data tape format defining a codeword quad having first and second codeword headers interleaved with first and second codeword pairs, each codeword header comprising N m-bit bytes $c_k = c_0, c_1, \ldots, c_{N-2}, c_{N-1}$ wherein K bytes $c_0$-$c_{K-1}$ of the first and second headers in a codeword quad differ such that if one is known the other can be inferred, the method comprising:
   redefining each header byte $c_k$ as comprising two interleaved nibbles, $e_k, o_k$;
   for each header, generating nibbles $e_K$-$e_{N-1}$ as a function of nibbles $e_0$-$e_{K-1}$;
   for each header, generating nibbles $o_K$-$o_{N-1}$ as a function of nibbles $o_0$-$o_{K-1}$;
   assembling a codeword quad with the redefined headers; and
   recording the codeword quad on a tape medium.

2. The method of claim 1, wherein, for each header:
   generating nibbles $e_K$-$e_{N-1}$ as a function of nibbles $e_0$-$e_{K-1}$ comprises generating nibbles $e_K$-$e_{N-1}$ such that the nibbles $e_0$-$e_{N-1}$ comprise a first Reed-Solomon (RS) codeword over Galois Field GF(16); and
   generating nibbles $o_K$-$o_{N-1}$ as a function of nibbles $o_0$-$o_{K-1}$ comprises generating nibbles $o_K$-$o_{N-1}$ such that the nibbles $o_0$-$o_{N-1}$ comprise a second RS codeword over GF(16).

3. The method of claim 2, wherein:
   N=10;
   $e_8 y + e_9 = R_{G(y)}[d^{(even)}(y)]$ where $R_{G(y)}[d^{(even)}(y)]$ denotes the remainder polynomial of the division of $d^{(even)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$; and
   $o_8 y + o_9 = R_{G(y)}[d^{(odd)}(y)]$, where $R_{G(y)}[d^{(odd)}(y)]$ denotes the remainder polynomial of the division of $d^{(odd)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$.

4. The method of claim 1, wherein the data tape format comprises a Linear Tape-Open, Generation 4 (LTO-4) format.

5. A method for correcting errors in codeword headers in a data tape format, the data tape format defining a codeword quad having first and second codeword pair headers $c^{(even)}$, $c^{(odd)}$ interleaved with first and second codeword pairs, each codeword header comprising N m-bit bytes $c_k=c_0, c_1, \ldots, c_{N-2}, c_{N-1}$ wherein K bytes $c_0$-$c_{K-1}$ of the first and second headers in a codeword quad differ such that if one is known the other can be inferred, the method comprising:
   redefining each header byte $c_k$ as comprising two interleaved even and odd nibbles, $e_k, o_k$, respectively;
   for each header, generating even nibbles $e_K$-$e_{N-1}$ as a function of even nibbles $e_0$-$e_{K-1}$ according to a first algorithm;
   for each header, generating odd nibbles $o_K$-$o_{N-1}$ as a function of odd nibbles $o_0$-$o_{K-1}$ according to the first algorithm;
   assembling a codeword quad with the redefined headers;
   recording the codeword quad on a tape medium;
   reading the recorded codeword quad from the tape medium;
   for each header, attempting to decode the header according to the first algorithm and
   computing a syndrome $s=[s^{(even)}, s^{(odd)}]=[s_0^{(even)} s_1^{(even)} s_0^{(odd)} s_1^{(odd)}]$ for the first header;
   computing a syndrome $s'=[s'^{(even)}, s'^{(odd)}]=[s_0'^{(even)} s_1'^{(even)} s_0'^{(odd)} s_1'^{(odd)}]$ for the second header;
   if $s=0$ or $s'=0$, indicating the absence of a detectable error in at least one of the first and second headers, generating the first and second codeword pairs from the header having the syndrome equal to zero;
   if $s \neq 0$ and $s' \neq 0$, indicating an error in both the first and second headers, attempting to decode the first and second headers;
   determining if the first and second headers were successfully decoded;

if the first and second headers were successfully decoded, determining if the payloads of the first and second headers is valid;

if the payloads of the first and second headers are valid, generating the first and second codeword pairs; and if the payload of either the first or second headers is not valid or if the first and second headers were not successfully decoded, providing an indication that the decoding attempt failed.

6. The method of claim 5, wherein, for each header:

generating nibbles $e_K$-$e_{N-1}$ as a function of nibbles $e_0$-$e_{K-1}$ comprises generating nibbles $e_K$-$e_{N-1}$ such that the nibbles $e_0$-$e_{N-1}$ comprise a first Reed-Solomon (RS) codeword over Galois Field GF(16); and generating nibbles $o_K$-$o_{N-1}$ as a function of nibbles $o_0$-$o_{K-1}$ comprises generating nibbles $o_K$-$o_{N-1}$ such that the nibbles $o_0$-$o_{N-1}$ comprise a second RS codeword over GF(16).

7. The method of claim 6, wherein:

N=10;

$e_8 y + e_9 = R_{G(y)}[d^{(even)}(y)]$, where $R_{G(y)}[d^{(even)}(y)]$ denotes the remainder polynomial of the division of $d^{(even)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$; and $o_8 y + o_9 = R_{G(y)}[d^{(odd)}(y)]$, where $R_{G(y)}[d^{(odd)}(y)]$ denotes the remainder polynomial of the division of $d^{(odd)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$.

8. The method of claim 5, wherein N=10 and computing the syndrome $s^{(e/o)}=[s_0, s_1]$ for the even or odd set of nibbles e/o comprises:

computing:

$$s_0^{(e/o)} = r^{(e/o)}(\alpha^7) = b_1^{(e/o)} \alpha^7 + b_0^{(e/o)} = e^{(e/o)}(\alpha^7) = \epsilon \alpha^{7j};$$

and $$s_1^{(e/o)} = r^{(e/o)}(\alpha^8) = b_1^{(e/o)} \alpha^8 + b_0^{(e/o)}(\alpha^8) = \epsilon \alpha^{8j},$$

where j is an error location and $\epsilon$ is an error value; and solving the syndrome equations for $\alpha^j$ and $\epsilon$ as:

$$\alpha^j = s_1/s_0$$

$$\epsilon = s_0(\alpha^8)^j.$$

9. The method of claim 5 wherein the data tape format comprises a Linear Tape-Open, Generation 4 (LTO-4) data tape format.

10. A system for correcting errors in codeword headers in a data tape format, the data tape format defining a codeword quad having first and second codeword pair headers $c^{(even)}$, $c^{(odd)}$ interleaved with first and second codeword pairs, each codeword header comprising N m-bit bytes $c_k = c_0, c_1, \ldots, c_{N-2}, c_{N-1}$ wherein K bytes $c_0$-$c_{K-1}$ of the first and second headers in a codeword quad differ such that if one is known the other can be inferred, the system comprising:

an ECC encoder operable to:

receive the first and second codeword pair headers;

redefine each header byte $c_k$ as comprising two interleaved nibbles, $e_k$, $o_k$;

for each header, generate even nibbles $e_K$-$e_{N-1}$ as a function of nibbles $e_0$-$e_{K-1}$;

for each header, generate odd nibbles $o_K$-$o_{N-1}$ as a function of nibbles $o_0$-$o_{K-1}$; and output revised first and second codeword pair headers; and a multiplexer operable to interleave the first and second codeword pair headers with the first and second revised codeword pairs and output a codeword quad to be recorded onto the tape medium.

11. The system of claim 10, wherein the multiplexer is a first multiplexer, the system further comprising:

a second multiplexer having first and second inputs coupled to receive the first and second codeword pair headers, respectively, and an output coupled to an input of the ECC encoder, the ECC encoder having an output coupled to first input of the first multiplexer; and a third multiplexer having first and second inputs coupled to receive the first and second codeword pairs, respectively, and an output coupled to a second input of the first multiplexer.

12. The system of claim 10, wherein:

the ECC encoder comprises:

a first ECC encoder operable to:

receive the first codeword pair header;

redefine the first header byte $c_k$ as comprising two interleaved nibbles, $e_k$, $o_k$;

for the first header, generate nibbles $e_K$-$e_{N-1}$ as a function of nibbles $e_0$-$e_{K-1}$;

for the first header, generate nibbles $o_K$-$o_{N-1}$ as a function of nibbles $o_0$-$o_{K-1}$; and output the revised first codeword pair header; and a second ECC encoder operable to:

receive the second codeword pair header;

redefine the second header byte $c_k'$ as comprising two interleaved nibbles, $e_k'$, $o_k'$;

for the second header, generate nibbles $e_K'$-$e_{N-1}'$ as a function of nibbles $e_0'$-$e_{K-1}'$;

for the second header, generate nibbles $o_K'$-$o_{N-1}'$ as a function of nibbles $o_0'$-$o_{K-1}'$; and output the revised second codeword pair header.

13. The system of claim 10, wherein the ECC encoder is operable to:

generate nibbles $e_K$-$e_{N-1}$ as a function of nibbles $e_0$-$e_{K-1}$ comprises generating nibbles $e_K$-$e_{N-1}$ such that the nibbles $e_0$-$e_{N-1}$ comprise a first Reed-Solomon (RS) codeword over Galois Field (GF)(16); and generate nibbles $o_K$-$o_{N-1}$ as a function of nibbles $o_0$-$o_{K-1}$ comprises generating nibbles $o_K$-$o_{N-1}$ such that the nibbles $o_0$-$o_{N-1}$ comprise a second RS codeword over GF(16).

14. The system of claim 13 wherein:

N=10;

$e_8 y + e_9 = R_{G(y)}[d^{(even)}(y)]$, where $R_{G(y)}[d^{(even)}(y)]$ denotes the remainder polynomial of the division of $d^{(even)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$; and $o_8 y + o_9 = R_{G(y)}[d^{(odd)}(y)]$, where $R_{G(y)}[d^{(odd)}(y)]$ denotes the remainder polynomial of the division of $d^{(odd)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$.

15. The system of claim 10 wherein the data tape format comprises a Linear Tape-Open, Generation 4 (LTO-4) data tape format.

16. A system for correcting errors in codeword headers in a data tape format, the data tape format defining a codeword quad having first and second codeword pair headers $c^{(even)}$, $c^{(odd)}$ interleaved with first and second codeword pairs, each codeword header comprising N m-bit bytes $c_k = c_0, c_1, \ldots, c_{N-2}, c_{N-1}$ wherein K bytes $c_0$-$c_{K-1}$ of the first and second headers in a codeword quad differ such that if one is known the other can be inferred, the system comprising:

an ECC encoder operable to:

redefine each header byte $c_k$ as comprising two interleaved even and odd nibbles, $e_k$, $o_k$, respectively;

for each header, generate even nibbles $e_K$-$e_{N-1}$ as a function of even nibbles $e_0$-$e_{K-1}$ according to a first algorithm;

for each header, generate odd nibbles $o_K$-$o_{N-1}$ as a function of odd nibbles $o_0$-$o_{K-1}$ according to the first algorithm;

a recording head to record and read each redefined header and each codeword pair in the codeword quad onto and from a tape medium;

a decoder operable to:

for each header, attempt to decode the header according to the first algorithm and computing a syndrome $s=[s^{(even)}, s^{(odd)}]=[s_0^{(even)} s_1^{(even)} s_0^{(odd)} s_1^{(odd)}]$ for the first header;

computing a syndrome $s'=[s'^{(even)}, s'^{(odd)}]=[s_0'^{(even)} s_1'^{(even)} s_0'^{(odd)} s_1'^{(odd)}]$ for the second header;

if $s=0$ or $s'=0$, indicating the absence of a detectable error in at least one of the first and second headers, generate the first and second codeword pairs from the header having the syndrome equal to zero;

if $s \neq 0$ and $s' \neq 0$, indicating an error in both the first and second headers, attempt to decode the first and second headers;

determine if the first and second headers were successfully decoded;

if the first and second headers were successfully decoded, determine if the payloads of the first and second headers is valid;

if the payloads of the first and second headers are valid, generate the first and second codeword pairs; and if the payload of either the first or second headers is not valid or if the first and second headers were not successfully decoded, provide an indication that the decoding attempt failed.

17. The system of claim 16, wherein, for each header, the decoder is further operable to:

generate nibbles $e_K$-$e_{N-1}$ as a function of nibbles $e_0$-$e_{K-1}$ such that the nibbles $e_0$-$e_{N-1}$ comprise a first Reed-Solomon (RS) codeword over Galois Field GF(16); and generate nibbles $o_K$-$o_{N-1}$ as a function of nibbles $o_0$-$o_{K-1}$ such that the nibbles $o_0$-$o_{N-1}$ comprise a second RS codeword over GF(16).

18. The system of claim 17, wherein:

N=10;

$e_8 y + e_9 = R_{G(y)}[d^{(even)}(y)]$, where $R_{G(y)}[d^{(even)}(y)]$ denotes the remainder polynomial of the division of $d^{(even)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$; and $o_8 y + o_9 = R_{G(y)}[d^{(odd)}(y)]$, where $R_{G(y)}[d^{(odd)}(y)]$ denotes the remainder polynomial of the division of $d^{(odd)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$.

19. The system of claim 16, wherein N=10 and the decoder is further operable to compute the syndrome)$s^{(e/o)}=[s_0,s_1]$ for the even or odd set of nibbles e/o by:

computing:

$s_0^{(e/o)} = r^{(e/o)}(\alpha^7) = b_1^{(e/o)}\alpha^7 + b_0^{(e/o)}(\alpha^7) = \epsilon \alpha^{7j}$; and $s_1^{(e/o)} = r^{(e/o)}(\alpha^8) = b_1^{(e/o)}\alpha^8 + b_0^{(e/o)}(\alpha^8) = \epsilon \alpha^{8j}$, where j is an error location and $\epsilon$ is an error value; and solving the syndrome equations for $\alpha^j$ and $\epsilon$ as:

$\alpha^j = s_1/s_0$ $\epsilon = s_0(\alpha^8)^j$.

20. The system of claim 16 wherein the data tape format comprises a Linear Tape-Open, Generation 4 (LTO-4) data tape format.

21. A computer program product of a non-transitory computer readable medium usable with a programmable computer, the computer program product having computer-readable code embodied therein for providing error correction coding to codeword headers in a data tape format, the data tape format defining a codeword quad having first and second codeword headers interleaved with first and second codeword pairs, each codeword header comprising N m-bit bytes $c_k=c_0, c_1, \ldots, c_{N-2}, c_{N-1}$ wherein K bytes $c_0$-$c_{K-1}$ of the first and second headers in a codeword quad differ such that if one is known the other can be inferred, the computer-readable code comprising instructions for:

redefining each header byte $c_k$ as comprising two interleaved even and odd nibbles, $e_k$, $o_k$, respectively;

for each header, generating even nibbles $e_K$-$e_{N-1}$ as a function of even nibbles $e_0$-$e_{K-1}$ according to a first algorithm;

for each header, generating odd nibbles $o_K$-$o_{N-1}$ as a function of odd nibbles $o_0$-$o_{K-1}$ according to the first algorithm;

assembling a codeword quad with the redefined headers;

recording the codeword quad on a tape medium;

reading the recorded codeword quad from the tape medium;

for each header, attempting to decode the header according to the first algorithm and computing a syndrome $s=[s^{(even)}, s^{(odd)}]=[s_0^{(even)} s_1^{(even)} s_0^{(odd)} s_1^{(odd)}]$ for the first header;

computing a syndrome $s'=[s'^{(even)}, s'^{(odd)}]=[s_0'^{(even)} s_1'^{(even)} s_0'^{(odd)} s_1'^{(odd)}]$ for the second header;

if $s=0$ or $s'=0$, indicating the absence of a detectable error in at least one of the first and second headers, generating the first and second codeword pairs from the header having the syndrome equal to zero;

if $s \neq 0$ and $s' \neq 0$, indicating an error in both the first and second headers, attempting to decode the first and second headers;

determining if the first and second headers were successfully decoded;

if the first and second headers were successfully decoded, determining if the payloads of the first and second headers is valid;

if the payloads of the first and second headers are valid, generating the first and second codeword pairs; and if the payload of either the first or second headers is not valid or if the first and second headers were not successfully decoded, providing an indication that the decoding attempt failed.

22. The computer program product of claim 21, wherein, for each header:

the instructions for generating nibbles $e_K$-$e_{N-1}$ as a function of nibbles $e_0$-$e_{K-1}$ comprise instructions for generating nibbles $e_K$-$e_{N-1}$ such that the nibbles $e_0$-$e_{N-1}$ comprise a first Reed-Solomon (RS) codeword over Galois Field GF(16); and the instructions for generating nibbles $o_K$-$o_{N-1}$ as a function of nibbles $o_0$-$o_{K-1}$ comprise instructions for generating nibbles $o_K$-$o_{N-1}$ such that the nibbles $o_0$-$o_{N-1}$ comprise a second RS codeword over GF(16).

23. The computer program product of claim 22, wherein:

N=10;

$e_8 y + e_9 = R_{G(y)}[d^{(even)}(y)]$, where $R_{G(y)}[d^{(even)}(y)]$ denotes the remainder polynomial of the division of $d^{(even)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$; and $o_8y+o_9=R_{G(y)}[d^{(odd)}(y)]$, where $R_{G(y)}[d^{(odd)}(y)]$ denotes the remainder polynomial of the division of $d^{(odd)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$.

24. The computer program product of claim 21, wherein N=10 and the instructions for computing the syndrome $s^{(e/o)}=[s_0, s_1]$ for the even or odd set of nibbles e/o comprise instructions for:

computing:

$$s_0^{(e/o)}=r^{(e/o)}(\alpha^7)=b_1^{(e/o)}\alpha^7+b_0^{(e/o)}=e^{(e/o)(\alpha^7)}=\epsilon\alpha^{7j}; \text{ and}$$

$$s_1^{(e/o)}=r^{(e/o)}(\alpha^8)=b_1^{(e/o)}\alpha^8+b_0^{(e/o)}=e^{(e/o)}(\alpha^8)=\epsilon\alpha^{8j},$$

where j is an error location and $\epsilon$ is an error value; and solving the syndrome equations for $\alpha^j$ and $\epsilon$ as:

$$\alpha^j=s_1/s_0$$

$$\epsilon=s_0(\alpha^8)^j.$$

25. The computer program product of claim 21, wherein the data tape format comprises a Linear Tape-Open, Generation 4 (LTO-4) data tape format.

26. A method for deploying computing infrastructure, comprising integrating computer readable code into a data tape system having a data tape format defining a codeword quad having first and second codeword pair headers $c^{(even)}$, $c^{(odd)}$ interleaved with first and second codeword pairs, each codeword header comprising N m-bit bytes $c_k=c_0, c_1, \ldots, c_{N-2}, c_{N-1}$ wherein K bytes $c_0$-$c_{K-1}$ of the first and second headers in a codeword quad differ such that if one is known the other can be inferred, wherein the code, in combination with the data tape system, is capable of performing the following:

redefining each header byte $c_k$ as comprising two interleaved even and odd nibbles, $e_k$, $o_k$, respectively;

for each header, generating even nibbles $e_K$-$e_{N-1}$ as a function of even nibbles $e_0$-$e_{K-1}$ according to a first algorithm;

for each header, generating odd nibbles $o_K$-$o_{N-1}$ as a function of odd nibbles $o_0$-$o_{K-1}$ according to the first algorithm;

assembling a codeword quad with the redefined headers;

recording the codeword quad on a tape medium;

reading the recorded codeword quad from the tape medium;

for each header, attempting to decode the header according to the first algorithm and computing a syndrome $s=[s^{(even)}, s^{(odd)}]=[s_0^{(even)} s_1^{(even)} s_0^{(odd)} s_1^{(odd)}]$ for the first header;

computing a syndrome $s'=[s'^{(even)}, s'^{(odd)}]=[s_0'^{(even)} s_1'^{(even)} s_0'^{(odd)} s_1'^{(odd)}]$ for the second header;

if s=0 or s'=0, indicating the absence of a detectable error in at least one of the first and second headers, generating the first and second codeword pairs from the header having the syndrome equal to zero;

if s≠0 and s'≠0, indicating an error in both the first and second headers, attempting to decode the first and second headers;

determining if the first and second headers were successfully decoded;

if the first and second headers were successfully decoded, determining if the payloads of the first and second headers is valid;

if the payloads of the first and second headers are valid, generating the first and second codeword pairs; and if the payload of either the first or second headers is not valid or if the first and second headers were not successfully decoded, providing an indication that the decoding attempt failed.

27. The method of claim 26, wherein, for each header:

generating nibbles $e_K$-$e_{N-1}$ as a function of nibbles $e_0$-$e_{K-1}$ comprises generating nibbles $e_K$-$e_{N-1}$ such that the nibbles $e_0$-$e_{N-1}$ comprise a first Reed-Solomon (RS) codeword over Galois Field GF(16); and generating nibbles $o_K$-$o_{N-1}$ as a function of nibbles $o_0$-$o_{K-1}$ comprises generating nibbles $o_K$-$o_{N-1}$ such that the nibbles $o_0$-$o_{N-1}$ comprise a second RS codeword over GF(16).

28. The method of claim 27, wherein:

N=10;

$e_8y+e_9=R_{G(y)}[d^{(even)}(y)]$, where $R_{G(y)}[d^{(even)}(y)]$ denotes the remainder polynomial of the division of $d^{(even)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$; and $o_8y+o_9=R_{G(y)}[d^{(odd)}(y)]$, where $R_{G(y)}[d^{(odd)}(y)]$ denotes the remainder polynomial of the division of $d^{(odd)}(y)$ by the generator polynomial $G(y)=(y+\alpha^7)(y+\alpha^8)=y^2+\alpha^{11}y+1$ and $\alpha$ is a primitive element of GF(16) satisfying $\alpha^4+\alpha+1=0$.

29. The method of claim 26, wherein N=10 and computing the syndrome $s^{(e/o)}=[s_0, s_1]$ for the even or odd set of nibbles e/o comprises:

computing:

$$s_0^{(e/o)}=r^{(e/o)}(\alpha^7)=b_1^{(e/o)}\alpha^7+b_0^{(e/o)}e^{(e/o)(\alpha^7)}=\epsilon\alpha^{7j}; \text{ and}$$

$$s_1^{(e/o)}=r^{(e/o)}(\alpha^8)=b_1^{(e/o)}\alpha^8+b_0^{(e/o)}=e^{(e/o)}(\alpha^8)=\epsilon\alpha^{8j},$$

where j is an error location and $\epsilon$ is an error value; and solving the syndrome equations for $\alpha^j$ and $\epsilon$ as:

$$\alpha^j=s_1/s_0$$

$$\epsilon=s_0(\alpha^8)^j.$$

30. The method of claim 26 wherein the data tape format comprises a Linear Tape-Open, Generation 4 (LTO-4) data tape format.

* * * * *